US010127185B1

(12) United States Patent
Anderson et al.

(10) Patent No.: US 10,127,185 B1
(45) Date of Patent: Nov. 13, 2018

(54) FORMAT AGNOSTIC DATA TRANSFER CIRCUIT

(71) Applicants: Brent L. Anderson, Summerville, SC (US); Justin Sellers, North Charleston, SC (US); Lance Gorrell, Summerville, SC (US); Jude Seeber, New York, NY (US)

(72) Inventors: Brent L. Anderson, Summerville, SC (US); Justin Sellers, North Charleston, SC (US); Lance Gorrell, Summerville, SC (US); Jude Seeber, New York, NY (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 43 days.

(21) Appl. No.: 15/384,668

(22) Filed: Dec. 20, 2016

(51) Int. Cl.
*G06F 13/38* (2006.01)
*G06F 13/40* (2006.01)
*G06F 13/42* (2006.01)
*G06F 13/28* (2006.01)
*G06F 13/24* (2006.01)
*G06F 13/16* (2006.01)

(52) U.S. Cl.
CPC ...... *G06F 13/4286* (2013.01); *G06F 13/1673* (2013.01); *G06F 13/24* (2013.01); *G06F 13/28* (2013.01)

(58) Field of Classification Search
CPC ........... G06F 13/38; G06F 13/40; G06F 13/42
See application file for complete search history.

(56) References Cited

U.S. PATENT DOCUMENTS

| 7,010,579 B1* | 3/2006 | Batcher ............... G06F 9/30032 709/217 |
| 8,294,400 B2 | 10/2012 | Harmer |
| 8,555,013 B1* | 10/2013 | Vick ....................... G06F 13/28 711/154 |
| 2010/0191874 A1* | 7/2010 | Feeley .................. G06F 13/385 710/24 |

* cited by examiner

*Primary Examiner* — David E Martinez
(74) *Attorney, Agent, or Firm* — SPAWAR Systems Center Atlantic; Arthur K. Samora; Kyle Eppele

(57) ABSTRACT

A format agnostic data transfer system and methods for transferring between disparate components in accordance can include a transmitting component having a data push controller, a receiving component having a processor, and a memory connected to the processor. The data push controller can receive configuration instructions from the receiving component processor transfer said data to said memory, without requiring the use of direct memory access (DMA) at said transmitting component. The reconfigurable nature of the data push controller can allow for both fixed and variable stream data to be sent, making the system data format agnostic. The receiving component can be a processor, while the transmitting component can be a field programmable gate arrays (FPGA) or an application specific integrated circuits (ASIC).

7 Claims, 6 Drawing Sheets

FORMAT AGNOSTIC DATA TRANSFER CIRCUIT

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Atlantic, Code 70F00, North Charleston, S.C., 29419-9022; voice (843) 218-3495; email ssc_lant_T2@navy.mil; reference Navy Case Number 104188.

FIELD OF THE INVENTION

The present invention relates generally to digital logic circuits. More specifically, the invention pertains to digital logic circuits that can provide a low level, unidirectional data transport mechanism for intra-chip or intra-element communication. The invention is particularly, but not exclusively, useful as a flexible, format-tolerant high speed data transport interface, which can reduce processor resource utilization for both variable and fixed length payloads.

BACKGROUND OF THE INVENTION

As known in the prior art, digital logic devices like Graphics Processing Units (GPUs) and Field Programmable Gate Arrays (FPGAs) are becoming more powerful and are becoming more and more capable of generating and processing large amounts of data. One of the challenges associated with this increased capability is the ability to transfer that large amount of data on and off the logical device.

For the purpose of optimizing streaming transfers, streaming transfers can be categorized according to transfer length two classes. These classes can be fixed length and variable length transfers. Fixed length transfers are ones where the size of the payload is fixed. Variable length transfers are ones where the payload length is not deterministic.

Processors cannot typically be interrupted to immediately receive data from an FPGA. Instead, data is placed into an easily accessed memory buffer and the processor is notified to pick up the data when available. If using a fixed length payload and both the sending FPGA and the receiving device processor know the size, transfers become simplified because the processor knows how much data it should be retrieving from the buffer. Additionally, if the rate the data is being transferred is known, and does not change, the processor knows how many transfers need to take place before the buffer overflows. These both represent problems that are not easily overcome for variable length payloads.

There are not any circuits in existence for generic payload transfers of both variable and fixed length data transfers; however, there are a couple domain specific solutions. One such solution is Direct Memory Access (DMA). DMA provides a convenient way to transfer fixed length payload data from one memory to another and in some cases will interface to a streaming interface. The main downfall of DMA engines are that they are very difficult to use for variable length transfers. The trade space for variable payload transmissions is cumbersome and produces high processor utilization, increased latency, and does not provide a method for knowing when the receive memory buffer overflows.

Another domain specific circuit is the transmission control protocol (TCP) offload engine (TOE). The TOE can provide a transfer circuit specifically for receiving variable length TCP packets. However, the TOE requires data to be formatted as a TCP packet. This formatting can add overhead to the transfer process, which is not necessary for the point-to-point or multicast network topologies. This can negatively affect the throughput and can require the logic device to have a TCP Stack, which can require additional internet protocol (IP), use up logic resources, and add latency.

In view of the above, it can be an object of the present invention to provide a format agnostic data transfer circuit that can be adapted to efficiently transfer both fixed and variable data sequences. Another object of the present invention can be to provide a format agnostic data transfer circuit that can be configured to transfer data between different types of logic devices. Still another object of the present invention can be to provide a format agnostic data transfer circuit that can minimize processor overhead and latency. Yet another object of the present invention can be to provide a format agnostic data transfer circuit, which can also increase software security and data integrity by implementation of hardware buffer tracking mechanisms. Yet another object of the present invention to provide a format-agnostic data transfer circuit that can be easy to implement in a cost-effective manner.

SUMMARY OF THE INVENTION

A format agnostic data transfer system and methods for transferring between disparate components in accordance can include a transmitting component having a data push controller, and a receiving component having a processor, and a memory connected to the processor. An interrupt generator on the transmitting component can be in communication with the data push controller, for providing flush control inputs to the data push controller. The transmitting component can further include a buffer tracker in communication with the interrupt generator. The buffer tracker can provide an external buffer size input to the interrupt generator.

The transmitting component for the data transfer system can further include a data push component in communication with the data push controller and the buffer tracker. The data push component can receive data push commands from said data push controller. The data push controller can receive configuration instructions from the receiving component processor transfer said data to said memory, without requiring the use of direct memory access (DMA) at said transmitting component. The reconfigurable nature of the data push controller can allow for both fixed and variable stream data to be sent. The receiving component can be a processor, while the transmitting component can be a field programmable gate arrays (FPGA) or an application specific integrated circuits (ASIC).

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, digital logic devices like Graphics Processing Units (GPUs) and Field Programmable Gate Arrays (FPGAs) are becoming more powerful and are capable of generating and processing large amounts of data. One of the challenges associated with this increased capability is developing an interface protocol that can efficiently transfer that large amount of data on and off the logical device.

For the purpose of optimizing streaming transfers, streaming transfer categorized streaming transfers into one of two classes. These classes are fixed length and variable length transfers. Fixed length transfers are ones where the size of the payload frames is fixed. Variable length transfers are ones where the payload frame length is not deterministic.

Figure 1:
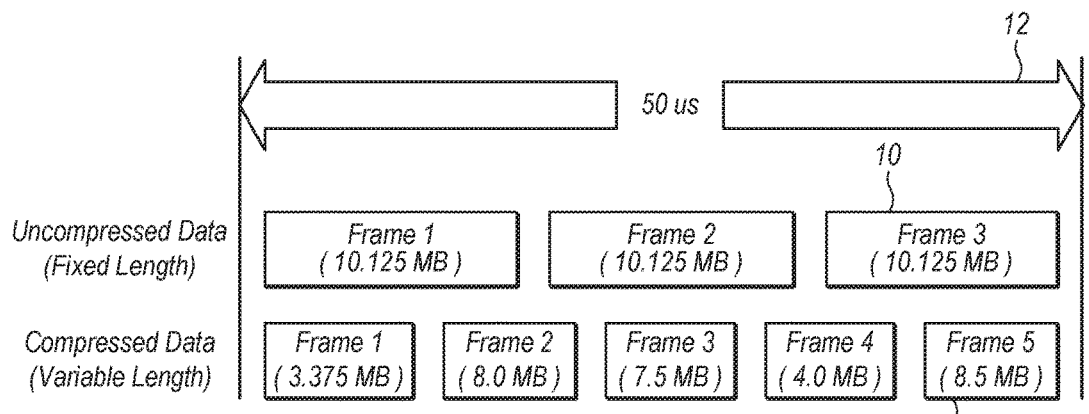
FIG. 1 is prior art representation of fixed and variable data streams over a time window.

Referring now to FIG. 1, a representation of such a data stream is shown. In FIG. 1, fixed data stream 10 can be a representation of uncompressed streaming video. For 4K Ultra High Definition (UHD) Video the number of pixels in the display is 8,294,400. Assuming a bit depth of 10, this can mean that the size of a single frame can be approximately 10.125 Mega Bytes per frame. FIG. 1 illustrates what a transfer of over a time sequence 12 of fifty microseconds (50 μs) might look like. As shown in FIG. 1, if a video stream can be compressed to maximize the framerate, the output would probably look something like the compressed transfer seen in data stream 14 in FIG. 1. Since the size of each transfer packet is variable in stream 14, it can be referred to as a variable length transfer.

Processors cannot typically be interrupted to immediately receive large amounts of data. Instead, data is placed into easily accessed memory buffer, and the processor is notified to pick up the data when available. If using a fixed length payload and both the sending and receiving devices know the size, transfers become simplified because the processor knows how much data it should be retrieving from the buffer. Additionally, if the rate the data is being transferred is known, the processor knows how many transfers need to take place before the buffer overflows. These both represent problems that are not easily overcome for variable length payloads such as variable data stream 14.

Figure 2:
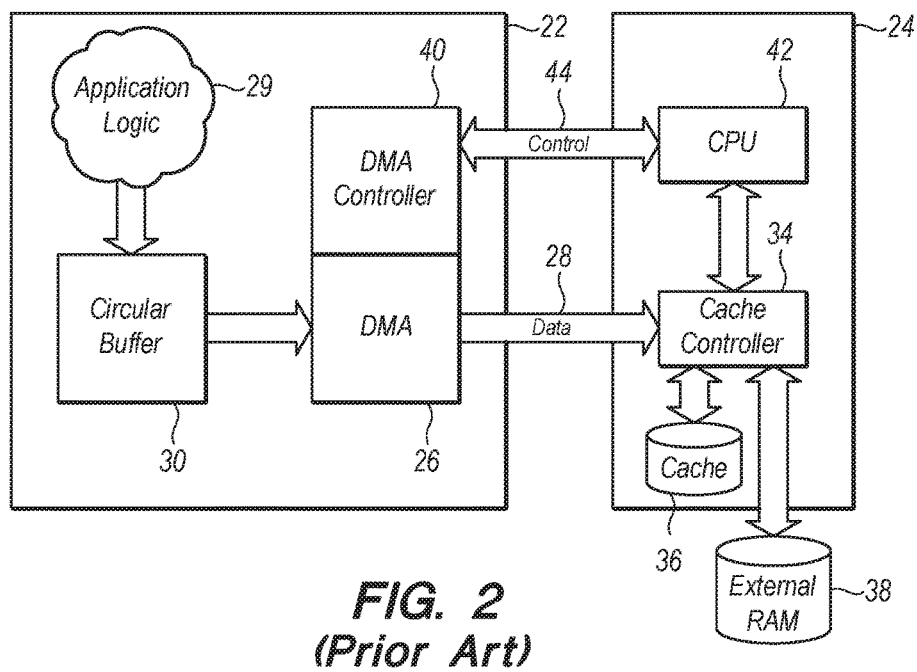
FIG. 2 is a high level block diagram of a prior art data transfer circuit.

Referring now to FIG. 2, a data transfer arrangement as known in the prior art is shown. As shown, a prior art data transfer system 20 can include a transmitting component 22 that can transfer data to a receiving component 24. Most modern digital logic systems like transmitting component can utilize direct memory access (DMA) 26 to send data (represented by arrow 28) to a receiving component 24 (in FIG. 2, transmitting component 22 is a field-programmable gate array, FPGA, and receiving component 24 is a processor). In the prior art, application logic 29 can write the outgoing data to a circular buffer 30, and the DMA 26 can receive data from circular buffer 30, and can transfers data 28 from the circular buffer 30, which is located on transmitting component 22, to the processor's memory system 32, represented by cache controller 34, cache 36 and external RAM 38 in FIG. 1.

With this type of configuration, the DMA controller 40 can interrupt the central processing unit (CPU) 42 once when data 28 is ready to be read. Only then can the processor instruct the DMA controller 40 to transfer the frame (data 28) to the processor 24. For variable frame sizes, the entire frame must be buffered until the end of the message has been written to the buffer before the processor is interrupted. The circular buffer for the circuit of the present invention is located on the processor, or somewhere else other than the transmitting component 22. This can offer significant latency and processor loading advantages over DMA-based systems, as described more fully below.

Figure 3:
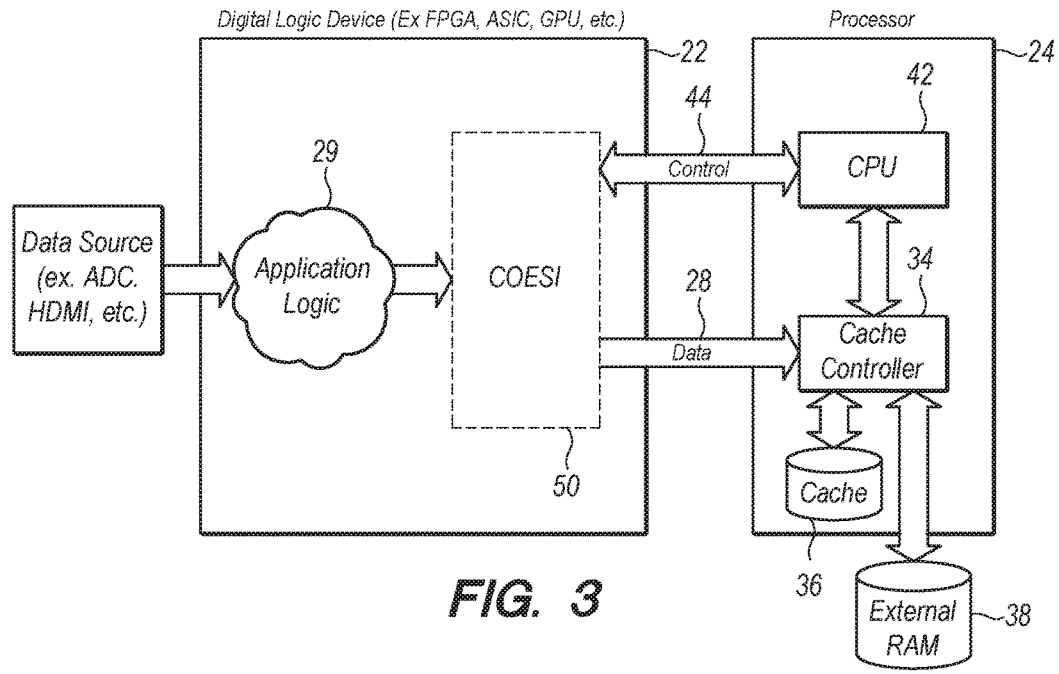
FIG. 3 is a high level block diagram of system that incorporates the data transfer circuit of the present invention according to several embodiments.
Figure 4:
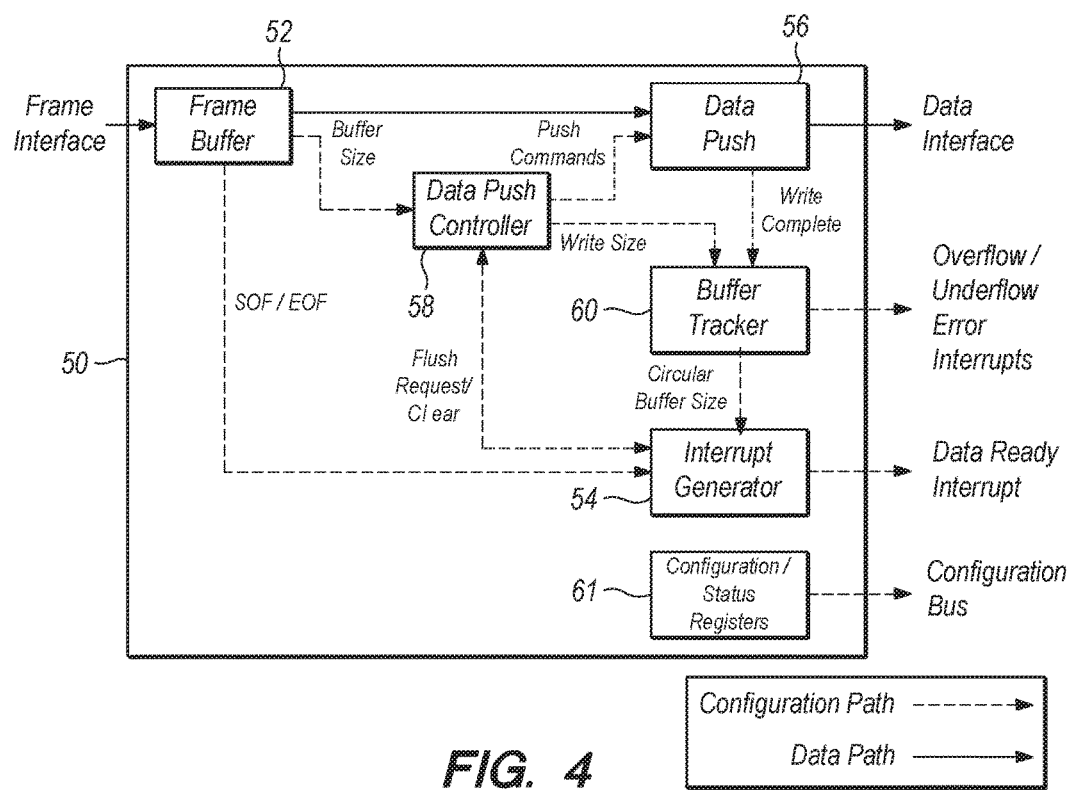
FIG. 4 is a block diagram of the format agnostic data transfer circuit of the present invention, according to several embodiments.

Stated differently, the format agnostic digital circuit of the present invention can provide a high speed streaming interface for both variable and fixed length payload transactions. This can be done in a way that is payload and/or protocol agnostic, meaning that the circuit does not rely on format such as contextual information like data length fields embedded within the payload itself. Many real-time embedded systems such as transmitting component 22 can have increasing digital logic capabilities while clock speed is staying relatively stagnant. Because of this, it was important that the interface of the present invention be developed to take advantage of the increased logic capabilities, while reducing the loading on the typically over-taxed CPU. This can be especially important for real-time applications. There are many hardware acceleration applications of this technology including, but not limited to Software Defined Radio, Software Defined Networking, System on a Chip (SoC) development, and System in Package (SiP) development, high speed financial transactions, cloud computing, data center acceleration, and remote sensing applications Referring now to FIG. 3, the format agnostic digital circuit of the present invention according to several embodiments and described above is shown, and is generally designated by reference character 50. Circuit 50 can provide an optimized way to transfer generic payload data, and circuit 50 can be used in soft (FPGA) or hard (application specific integrated circuit, ASIC) platform logic. The present invention can provide a single generic circuit that is reconfigurable to provide a highly optimized transfer for most payload types. This aspect is important to designs that need maximum flexibility and performance. One example of this are SoC's and SiP's who tightly couple processors with highly capable and reconfigurable logic designs like FPGAs. This method of the present invention can provide a generic way to send large amounts of data to the processors memory while optimizing processor overhead and latency. FIG. 3 illustrates a high level representation of where circuit 50 of the present invention would fit in a system where a programmable logic device would stream data to a processor Referring now to FIG. 4, a circuit 50 of the present invention can be shown in greater detail. As shown, circuit 50 can include a frame buffer 52, which can receive a data input from a frame interface, and which can provide a data path output to data push component 56. Frame buffer can also provide a start of frame/end of frame (SOF/EOF) configuration as an output to interrupt generator 54, and a buffer size configuration input to a data push controller 58. Data push controller 58 can further receive (and send) flush request and flush clear configuration parameters from (and to) interrupt generator 54. Still further, data push controller 58 can provide a write size configuration input to buffer tracker 60. Buffer tracker can further provide a push command configuration path output to data push component 56 as shown in FIG. 4. Data push component 56 can also have a write complete configuration output to buffer tracker 60. Buffer tracker 60 can also provide a circular buffer size input to interrupt generator 54, as shown in FIG. 4. Configuration status registers component 61 can have a configuration path to CPU 42 of receiving component 24.

Figure 5:
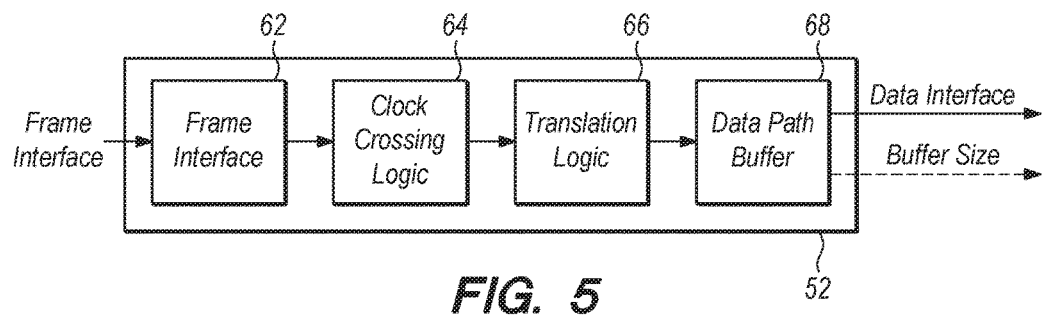
FIG. 5 is a block diagram of the frame buffer component of the circuit of FIG. 4.

Referring now to FIG. 5, the frame buffer 52 is shown in greater detail. As shown, frame buffer can include a frame interface 62, which can receive the frame interface data. Clock crossing logic component 64 can receive the data path output from frame interface 62, and provide a data path output to translation logic component 66. Translation logic component 66 can provide an output data path to data path buffer 68. The data path buffer 68 can provide the data interface output to data push component 56 (FIG. 4), and a buffer size configuration path output to data push controller 58. As shown in FIG. 4, frame buffer 52 can also have a start of frame (SOF) and an end of frame (EOF) configuration path input to interrupt generator 54 (see FIG. 4).

The frame buffer 52 can provide interfacing to the application logic, clock domain separation and data path buffering. A simple framing interface like illustrated in FIG. 6 can be provided to the application logic, which can be used to push data into the circuit of the present invention. The clock crossing logic component 64 can provide clock domain separation between the application logic 29 and the memory interface. There are several ways to implement this component; however one method that may be used is to implement an asynchronous first in first out (FIFO) buffer, which allows maximum flexibility of clock rates between the two clock domains. This clock crossing step can be optional, but it is likely to be used in most implementations of the present invention. Optionally, the clock crossing logic component 64 can also provide data width conversion, if the application logic needs a different data width than the data interface 28 (see FIG. 3) can provide.

Figure 6:
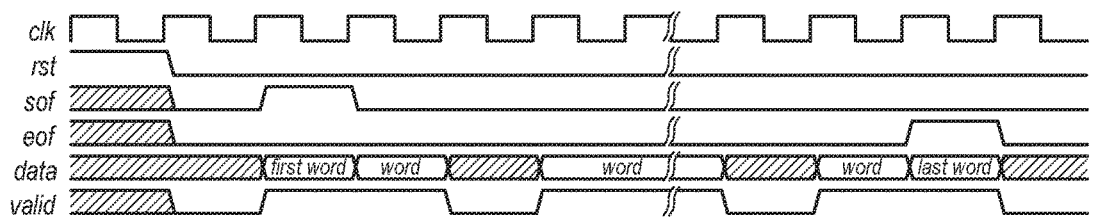
FIG. 6 is a representation of the data stream formatting.

Translation logic component 66 in FIG. 5 can be responsible for formatting and encoding the frame data in the manner prescribed by application logic 29 (see FIG. 6). This component can provide data width translation if necessary. In general, the circuit of the present invention is a generic transport, and the circuit 50 typically does not transmit contextual or packetized data over the data interface 28 (FIG. 3), maximizing throughput. In certain circumstances, however, it can make sense to transmit encoded data for better transmission security or interoperability. In these cases, translation logic component 66 can be used for real-time encoding of the data. Examples of this encoding can include metadata such as parity check, Forward Error Correction (FEC), encryption, frame timestamps, and other types of encoding data.

Referring again to FIG. 5, Data Path Buffer component 68 can provide buffering for the data path for the circuit 50 of the present invention by providing a buffer size configuration input to data path controller 58. This buffering is necessary for data flow control. This can be important for many memory mapped interfaces to allow data bursting, as described more fully below. Additionally, this component can still be necessary for non-bursting applications to allow time for the Data Push component 56 and Data Push Controller 58 to initialize a memory transaction.

Figure 7:
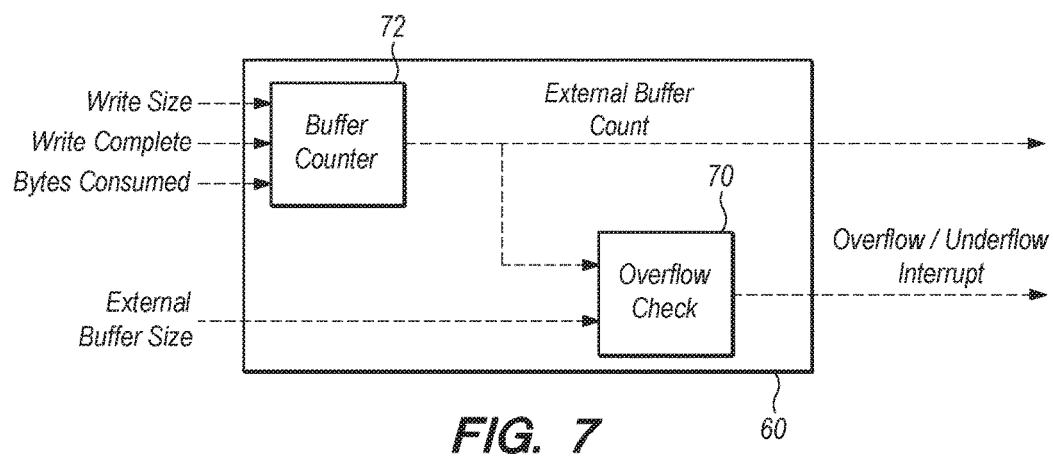
FIG. 7 is a block diagram of the buffer tracker component of the circuit of FIG. 4.

Referring now to FIG. 7, the buffer tracker 60 of the present invention is shown in greater detail. Buffer tracker 60 can track data as it is being sent. With configurations that include buffer tracker 60, the processor on receiving component 24 (CPU 42) no longer needs to actively manage the data transfer. When the processor is ready for the data it can read the buffer size, it will indicate the amount of data that is already in the local buffer. The processor does not need to command circuit 50 to make any transactions as in many DMAs. When combining these aspects of the present invention with the interrupt generator 54 described below, this saves the processor power and processing resources by allowing it to stay in a sleep state longer. As shown, buffer tracker 60 can include an overflow check 70 and a buffer counter 72. As shown in FIG. 7, buffer counter 72 can receive write size (from data push controller 58), write complete (from data push component 56) and bytes consumed inputs from CPU 42 of receiving component 24 via a control (configuration) interface. Buffer counter 72 can output an external buffer count to overflow check 70 and to receiving component 24. Overflow check 70 can receive an external buffer count and external buffer size inputs and can output an overflow/underflow interrupt to the processor receiving component 24.

The buffer tracker 60 can be responsible for keeping track of the buffer size and providing overflow/underflow interrupts to inform the CPU 42 for receiving component 24 that the data buffer may be corrupt. The buffer counter can also keep track of the utilized buffer size in bytes. When the data push controller 58 (FIG. 4) initiates a transfer to the external memory, it provides the size of that transfer to the buffer counter 72. Once the receiving component 24 no longer needs data within the buffer, it informs the Buffer counter via the Bytes consumed interface. In certain fixed data length applications, the buffer tracker may not be necessary and the interrupt can be masked by the receiving component 24.

Figure 8:
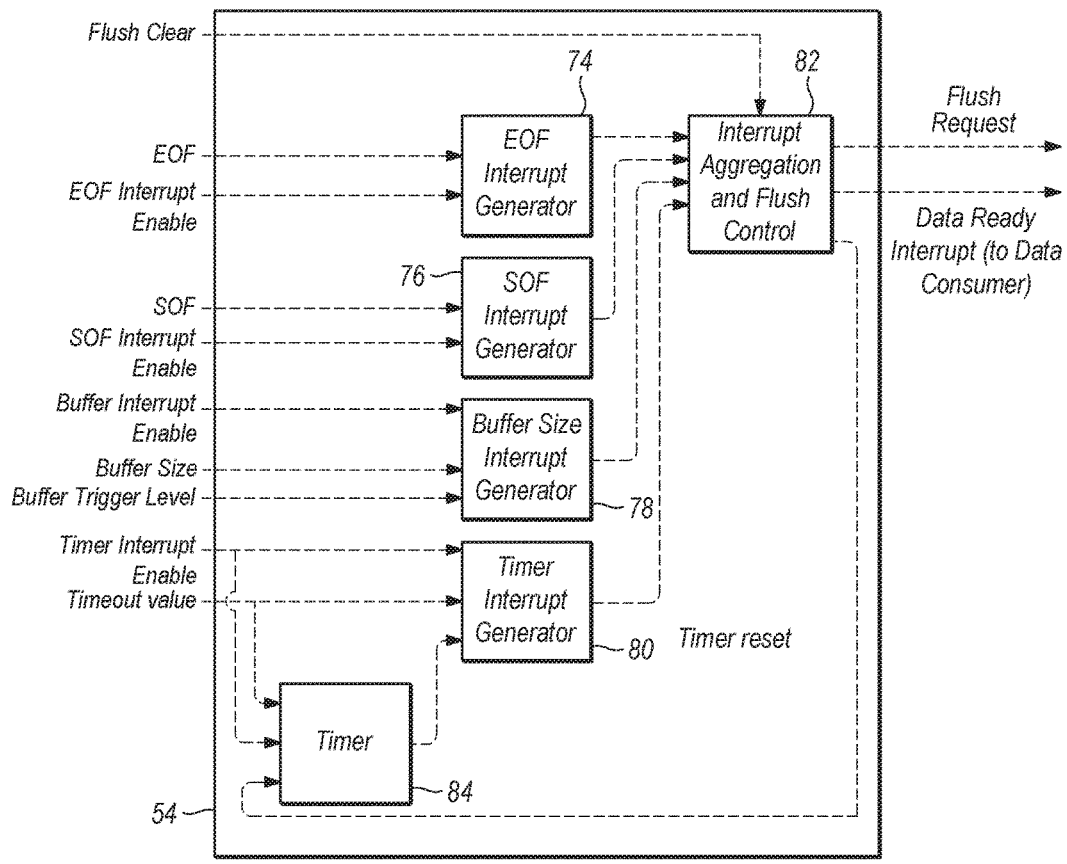
FIG. 8 is a block diagram of the interrupt generator component of the circuit of FIG. 4.

Referring now to FIG. 8, the interrupt generator 54 is shown in greater detail. As shown, interrupt generator 54 can include an EOF interrupt generator 74, a start of frame (SOF) interrupt generator 76, a buffer size generator 78 and a timer interrupt generator 80 as path configuration inputs to interrupt generator 54. As their names imply, each of the signal generators 74, 76, 78 and 80 can generate an interrupt signal output based on EOF, SOF, buffer size, and timeout conditions in the data stream. All of these signal outputs can be seen in FIG. 8 as an input to interrupt aggregation and flush control component 82. Flush component 82 can receive an additional flush clear input from data push controller 58, provide a data pipeline flush configuration output command to data push controller 58 and a data ready interrupt command to receiving component 24. Flush control component 82 can also provide a feedback input (to reset the timer) to timer 84, and timer 84 can further provide an input to timer interrupt generator 80, as shown in FIG. 8.

From the above, it can be seen that interrupt generator 54 can provide a flexible framework for interrupting the receiving component 24. Interrupt generator 54 can further provide flush control to minimize latency in certain configurations. Interrupt generator 54 can be highly configurable and it can be optimized for several configurations as described herein. Interrupts can be sent in the following conditions: 1) last data word in frame (EOF) has been sent to the external buffer; 2) External buffer has reached a configurable size; 3) A configurable amount of time has passed since previous interrupt (timeout); and, 4) First data word in frame (SOF) has been sent to the external buffer. The timeout interrupt may also be used in conjunction with the other interrupts. Additionally, timer in FIG. 8 can be reset when an enabled interrupt is sent. Still further, the EOF and timer interrupts are flushing interrupts, meaning that before the receiving component 24 is notified, the data currently in the Frame Buffer is pushed out (flushed) to the external memory.

Figure 9:
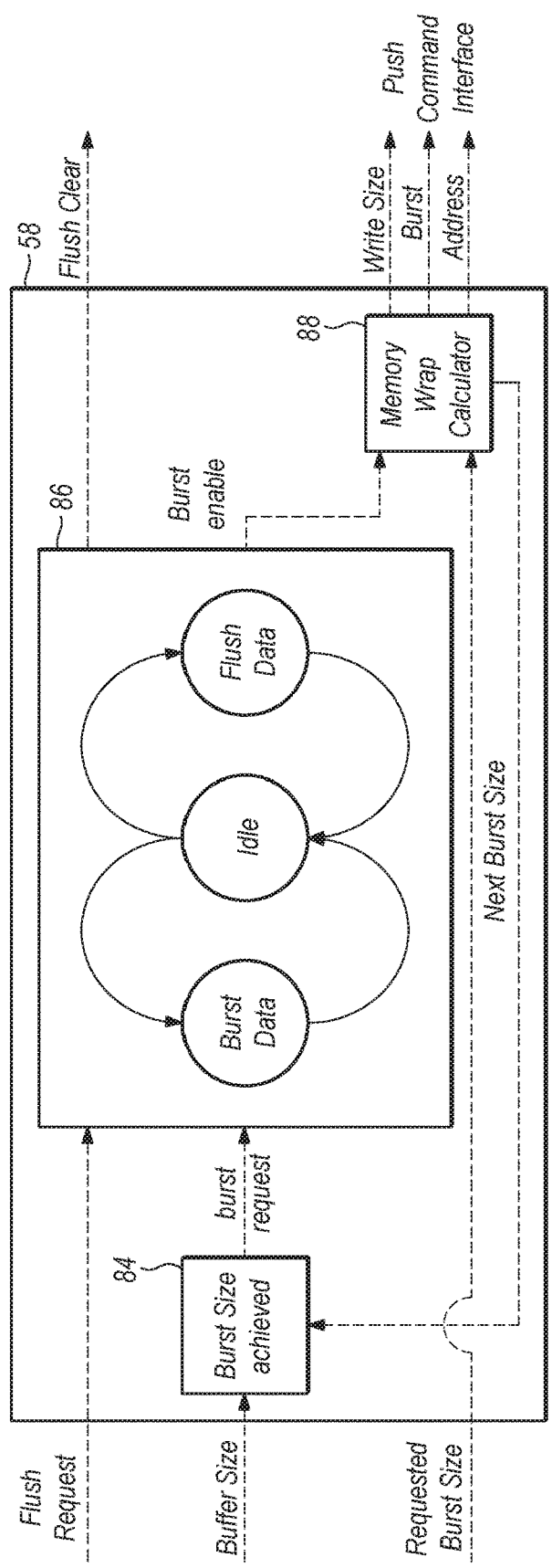
FIG. 9 is a block diagram of the data push controller component of the circuit of FIG. 4; and, FIG. 10 is a block diagram, which represents steps that can be taken to accomplish the methods of the present invention according to several embodiments.

Referring now to FIG. 9, the data push controller 58 of the circuit 50 is shown in greater detail. As shown, data push controller 58 can include a burst size achieved component 84, which can receive a buffer size configuration path input (from frame buffer 52) and a next burst size feedback configuration input from memory wrap calculator component 88. Component 84 can further output a burst request command via a configuration path to burst component 86, as shown in FIG. 9. Burst controller 86 can output a burst enable command to memory wrap calculator 88, and calculator 88 can send the actual burst. Burst controller 86 can also send a flush clear output, which can be received by interrupt generator 54 (See FIG. 4).

Data Push Controller 58 can be tailored to the type of interface it utilized to connect the logic device to the receiving component 24. For example, the data push controller 58 can provide an interface to allow receiving component 24 to control burst sizes and wrap boundaries via control 44.

Data Push Controller (DPC) 58 can be responsible for controlling the data flow through the circuit 50 of the present invention according to several embodiments. As data becomes available in the Frame Buffer 52, the Data Push controller 58 can calculate the appropriate memory addresses and transfer sizes (memory mapped interfaces are the most likely to use the data transfer circuit of the present invention. Memory mapped interfaces use a memory address to get to a respective memory location. Thus, the memory mapped interface requires an address to tell the memory where to store the data words it is receiving). In the case of burstable interfaces as seen in FIG. 9, the DPC 58 can also calculate appropriate burst boundaries and wrap conditions using the structure and component relationships described above. After the appropriate transfers are calculated, the burst controller 86 portion of DPC 58 can send commands to the Data Push component 56, which can pull the data out of the frame buffer 52. As such burst control 86 can requires tailoring to the specific memory interface. Additionally, the DPC 58 can be responsible for initiation a data path flush when signaled to do so by the Interrupt Generator 54.

Referring back to FIG. 4, the data push component 56 can interface with the data bus that is used to send data to the external buffer which can reside in cache 36 and external RAM 38. Data push 56 can receive commands from the DPC 58 as to what transfers need to take place, as well as how those transfers need to occur. For example, a command for a burstable memory-mapped interface would include the starting address and number of words (FIG. 6) to be transferred. After the Data Push component 56 receives the command, it pulls the required data from the frame buffer 52 and pushes it out over the external data interface.

Figure 10:
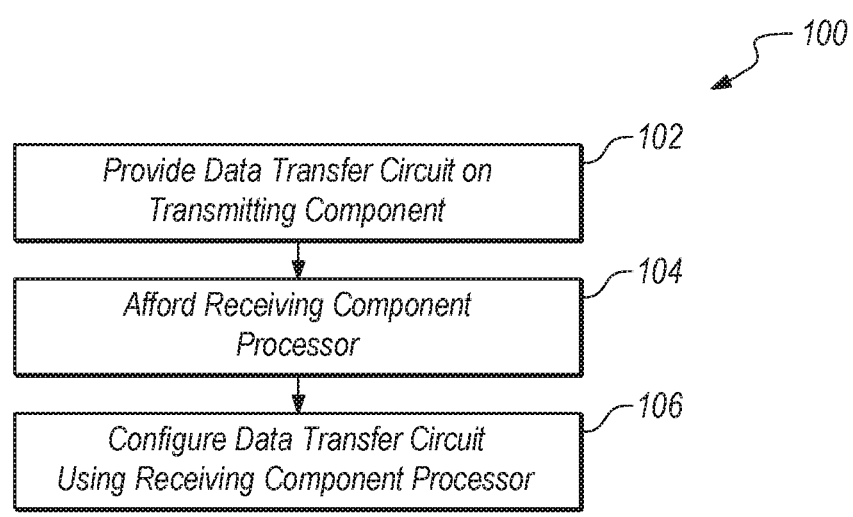

Referring now to FIG. 10, a block diagram is included which shows exemplary steps that can be taken to accomplish the method 100 of the present invention according to several embodiments. As shown, method 100 can include the initial step 102 of providing the circuit 50 in the transmitting component 22, and affording processor in the receiving component 24. The receiving component 24 CPU 42 can then configure circuit 50 of the present invention, as shown by step 106, by providing the location of the buffer (in FIG. 3, buffer 36 is located in receiving component 24, but it can be elsewhere). CPU 42 can further configure circuit 50 of the present invention over the configuration interface with the circular buffer space available to the receiving component 24, and the desired functionality of interrupts and latency to interrupt generator, as shown by step 104 and 106, respectively.

During operation, the circuit 50 of the present invention according to several embodiments can push data received from the Application Logic 29 on transmitting component 22 into allocated circular buffer (which is not located on transmitting component 22). Once an interrupt condition is met, circuit 50 can flush the data pipeline, update the processor accessible data count, and notify the processor CPU 42 of the condition. The external buffer tracker 60 continually keeps track of the data left in the external buffer, and can notify the processor CPU 42 if overflows occur, and can appropriately wrap data into the circular buffer 36. After the CPU 42 for receiving component 24 is finished with the data, it can write the number of bytes consumed to a configuration register over the configuration bus, and can notify the buffer tracker that this memory has been freed up for use.

The core configuration parameters for the interrupt generator 54 of the circuit 50 of the present invention can include the EOF parameter, e.g., when interrupt generator 54 pushes the last data of a frame to the circular buffer, which can facilitate low latency optimization. Buffer Size can also be another core parameter, i.e., when the circular buffer reaches a certain size (fixed data, high throughput). Optimization of the buffer size parameter can result in increased throughput optimization in the case of fixed data streams. The timer 84 can combine with buffer size interrupts to provide some protection against long latency. SOF timer conditions can also be configured.

The advantages of the circuit of the present invention over the prior art can include the provision of a high speed streaming interface. The circuit of the present invention can store the data in RAM from the receiving component, not the transmitting component, or the component transferring data, which can result in significantly lower access times than external device interfaces. The circuit 50 of the present invention can also be connected to a processor with on-chip cache. Because of the ability to fine tune the data transfer and the interrupt conditions, the chance of the processor receiving the data from cache rather than RAM is increased, which can result in extremely reduced access time to the receiving component 24. The buffer size can also be configured by the receiving component processor. Ability to use external RAM can significantly reduce the necessary RAM footprint on transmitting component (source) device.

The circuit of the present invention can be agnostic of the payload being sent. Rather than the transfer size being fixed or parsed from the payload itself, the payload size is simply dictated by the application logic's control of the framing bits. This avoids additional logic incurred by formatting the data at both the source and destination. Additionally, this may provide increased throughput for small payloads as they will not require any framing overhead.

The circuit 50 of the present invention can be extremely flexible, as it can be used for optimized transfers of both fixed and variable length payloads. Optimization can be controlled by the application logic rather than set by hardware. This can be valuable for high performance designs which require interface reuse by multiple application logic components. Examples of this can include SoCs, SiPs, FPGA platform code and FPGA utilizing partial reconfiguration. Moreover, because of the SOF and EOF interrupt capabilities, The present invention potentially provides a significantly reduced latency, when compared to prior art DMA interfaces (FIG. 2). This is because the payload is flushed and the processor is notified as soon as the EOF is indicated.

Because of the reduced latency for variable payloads, the probability of a cache hit can be maximized. Additionally, the unique external buffer tracker for circuit 50 can allow circuit 50 to keep track of how much unused space remains in the circular buffer. Additionally, this consumption based interface allows a processor to delay consumption. This allows the processor to modify data in place as long as a sufficient buffer exists.

The circuit 50 of the present invention according to several embodiments can be implemented in any digital logic device. This could include, but is not limited to FPGAs, Processors, Graphical Processing Units (GPUs), and Application Specific Integrated Circuits (ASICs). Circuit 50 can also be used with most any type of transport interface. This includes, but is not limited to common memory mapped and streaming interfaces. Finally it should be appreciated the circuit can also be used to transfer data to a receiving component that is an FPGA with a soft processor core or an ASIC who has the ability to properly service the interface.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for transferring data having a format, said system comprising:
    a transmitting component having a data push controller;
    said transmitting component including an interrupt generator in communication with said data push controller, said interrupt generator receiving flush control inputs from said data push controller;
    said transmitting component further including a buffer tracker in communication with said interrupt generator, said buffer tracker providing an external buffer size input to said interrupt generator;
    a receiving component having a processor, and a memory connected to said processor; and,
    said data push controller receiving configuration instructions from said processor of said receiving component, to transfer said data to said memory, without requiring the use of direct memory access (DMA) at said transmitting component, and without relying on said format of said data.

2. The system of claim 1, further comprising a data push component in communication with said data push controller and said buffer tracker, said data push component receiving data push commands from said data push controller, said data push component providing write complete configuration instructions to said buffer tracker.

3. The system of claim 2 wherein said receiving component is a processor, and said transmitting component is selected from the group consisting of field programmable gate arrays (FPGAs) and application specific integrated circuits (ASICs).

4. The system of claim 1, wherein said format is selected from the group consisting of variable stream data and fixed stream data.

5. A circuit for transmitting data from a transmitting component to a receiving component, said circuit comprising:
    a data push controller, said data push controller receiving configuration instructions from a processor on said receiving component, to transfer said data to memory on said receiving component;
    an interrupt generator in communication with said data push controller, said interrupt generator receiving flush control inputs from said data push controller, said interrupt generator further including a buffer tracker in communication with said interrupt generator, said buffer tracker providing an external buffer size input to said interrupt generator;
    a data push component in communication with said data push controller and said buffer tracker, said data push component receiving data push commands from said data push controller, said data push component providing write complete configuration instructions to said buffer tracker;
    a frame buffer, said frame buffer receiving said data from said transmitting component and further sending said data to said data push controller, for further transmission to said receiving unit, said frame buffer further providing a buffer size input to said data push controller; and,
    said frame buffer, said data push controller, said data push component, said buffer tracker and said interrupt generator cooperating to transmit said data to said receiving component without requiring the use of direct memory access (DMA) at said transmitting component.

6. The circuit of claim 5, wherein said data is selected from the group consisting of variable stream data and fixed stream data.

7. The circuit of claim 5 wherein said receiving component in a processor, and said transmitting component is selected from the group consisting of field programmable gate arrays (FPGAs) and application specific integrated circuits (ASICs).

* * * * *